ent to furnish car designers with entirely new possibilities of creating new and beautiful car designs by doing away with the cluttered appearance of a plurality of individual light fixtures at the front and rear ends of a car, and combining them into one or no more than two light units, the protective caps over the two light units—particularly when combined by the connecting cover—forming the structural end portions of the car and blending with and rounding off the general design of the car.

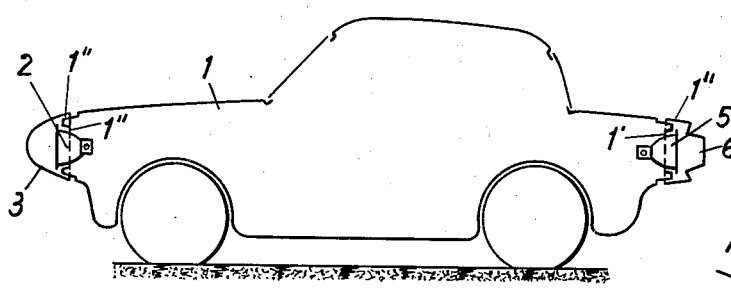
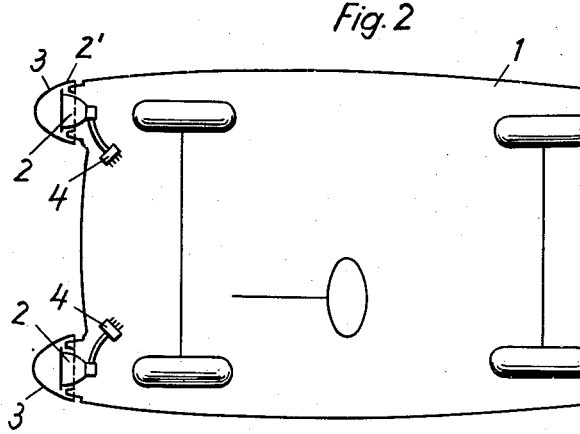
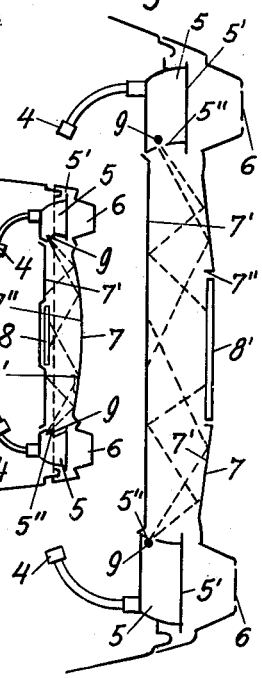
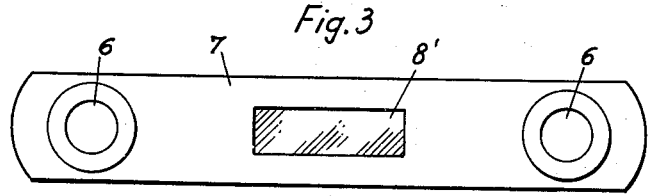

2,900,491

LIGHT SYSTEM FOR AUTOMOBILES

Béla Barényi, Stuttgart-Hohenheim, and Karl Wilfert, Stuttgart-Degerloch, Germany, assignors to Daimler-Benz Aktiengesellschaft, Stuttgart-Unterturkheim, Germany Application February 21, 1955, Serial No. 489,662

Claims priority, application Germany February 22, 1954

9 Claims. (Cl. 240—7.1)

The present invention relates to a lighting system for automobiles and more particularly to new improvements in external light fixtures therefor.

It is the principal object of the present invention to devise a new method and means to facilitate the installation and replacement of the various outer light fixtures of a car considerably.

Another object of the present invention is to combine the various outer light fixtures at each corner of a car into a single unitary structure.

Another object of the present invention is to devise such a lighting unit which includes a plurality of individual light fixtures, so as to be easily connected and disconnected electrically as well as easily installed on or removed from a car as a single unit.

It is a further object of the present invention is to provide a car with uniform front and rear ends, both, insofar as their size and shape is concerned, thus permitting the same kind and shape of light units according to the invention to be mounted on both ends of the car.

Another object of the present invention is to provide the light units according to the invention with outer protective caps which are designed with individual apertures for the passage of the individual light beams and More specifically, it is an object of the invention to provide such protective caps with different glass lenses designed and dimensioned in accordance with the particular light fixtures within the light unit with which they are to cooperate.

A further object of the present invention is to provide the new light units with lateral apertures or slots through which a certain amount of light is deflected from the normal light fixtures therein so as to illuminate certain parts of the car, such as, for example, the engine compartment or the trunk compartment of the car.

Another important object of the present invention resides in providing the individual light units which are mounted at the opposite corners of at least one end of the car with a connecting element or elongated cover which combines the two light units or the outer protective caps thereof externally into a single unit so as to brace them relative to each other, and improve the manner of securing them to the car body.

A further object of the invention resides in utilizing the elongated cover connecting the two light units according to the invention for illuminating purposes, that is, for reflecting the light from one of the light fixtures within the two light units upon the license plate.

Another object of the present invention consists in utilizing the connecting element between the two light units at least at the rear end of a car as a cover for the license plate. For this purpose, the mentioned connecting element which may, at the same time, act as a reflector to illuminate such license plate, either may be provided with a cutout portion or with a transparent window of a size permitting the license plate to be well seen therethrough.

Last, but not least, it is an object of the present in-

A principal feature of the invention for accomplishing the above object consists in providing the light units in the form of removable reflector inserts which are mounted in suitable apertures in the outer covering of the car by means of flanged portions on the respective parts, with the outer caps covering such apertures and flanges so as to merge the light units smoothly with the main part of the car body.

For facilitating the installation of the individual units of light fixtures on the car or their removal therefrom, each unit is preferably provided with a separate multiple plug to be connected to the light circuit of the car.

Further objects, features, and advantages of the present invention will be apparent from the following detailed description thereof and the accompanying drawings, in which—

Fig. 1 shows diagrammatically a longitudinal section of a car provided with the light units according to the invention; while Fig. 2 shows a cross section thereof.

Referring to the drawings, the body 1 of a passenger car is preferably shaped so that its front and rear ends are substantially identical in shape resulting, for example, in the rectangular pontoonlike shape as shown in plan in Fig. 2. As shown, although slightly curved, the sides of the body are defined by lines which are substantially parallel to each other. As further shown in this view, each of the caps 3 on one side of the vehicle body is so contoured and positioned that in this view its contour constitutes generally an extension of the one of said lines on said side. Near the corners at both the front and rear ends, the car body 1 is provided with suitable apertures 1' in which inserts 2 and 5, respectively, are mounted by means of flanges 2' and 5' provided along the edges of the inserts 2 and 5, whereby the inserts may be removably secured by any suitable means either to the wall portions adjacent the apertures in the car body or to cooperating flanges 1" provided thereon, as indicated in the drawings. These inserts 2 and 5 which form essentially cup-shaped receptacles are made of a size and shape so as to accommodate or receive therein the combination of all the outer light fixtures (not shown) ordinarily used at that respective end of a car, that is, for example, in the front inserts 2, the city and driving headlights, fog light, blinker light, parking light, and the like, and in the rear inserts 5, the main rear or backing light, the taillight, brake light, blinker light, and parking light. The light fixtures themselves may be of any conventional type and may be made in any suitable and well-known manner. However, the light fixtures do not form any part of the present invention. The inserts 2 and 5 may either, themselves, constitute reflectors for the various lights therein, or mere housings or receptacles for the various light fixtures which in that case may be provided with their own reflectors within such housing. The individual light fixtures within each insert 2 and 5 are preferably connected to a multiple plug 4 which may be connected to the light circuit of the car. This feature also facilitates the installation of the light units on the car as well as their quick removal therefrom.

All these individual light fixtures within each unit 2 and 5, respectively, are covered by a cap 3 and 6 respectively of suitable shape and dimensions and provided with appropriate apertures corresponding with the respective light fixtures which may be provided with individual lenses of either plain or colored glass in accordance with each respective light in the unit.

In the particular embodiment of the invention as shown in the drawings, two different types of such caps are provided on the front and rear ends of the car, the front caps 3 being of a well rounded shape, blending with the adjacent portions of the car body, and forming a forwardly projecting end portion thereof. The rear caps 6, on the other hand, are connected with each other by a cover 7 of a shape depending upon its particular function as subsequently described, as well as the shape of the car body so as to harmonize therewith. It may either be integral with the inserts 5, the inserts and the cover 7 then forming a single element, or be connected to the inserts 5 so as to be removable separately therefrom.

This cover 7 preferably forms a container for the rear license plate 8 of the car and is for this purpose provided either with a cutout portion or opening 7" or with a transparent window of a size sufficient to permit the license plate to be easily seen from the rear.

As diagrammatically illustrated in Fig. 2, the cover 7 preferably serves as a reflector for illuminating the rear license plate 8. The source of light for such reflector may either consist of a separate light fixture 9 provided in the units 5, the light beam then passing out of the units 5 through suitable lateral outlets 5" provided therein, or a certain amount of the light issuing or emanating from one of the fixtures in each unit 5 may be reflected through a suitable slot 5" in the side wall of each unit 5 upon the inner walls 7' from which it is then reflected back upon the license plate 8. The license plate may, however, also be formed by a transparent plate 8' mounted in the window cutout or gap 7" of the cover 7 which is then floodlighted from behind with the light shining therethrough, as shown in Figs. 3 and 4.

Although our invention has been illustrated and described with reference to the preferred embodiments thereof we wish to have it understood that it is in no way limited to the details of such embodiments or to the specific examples described, but is capable of numerous modifications within the scope of the appended claims.

Having thus fully disclosed our invention, what we claim is:

1. In a motor vehicle having an outer body, said body having apertures in its front end and rear end near the outer corners thereof, a housing removably secured within each of said apertures, adapted for receiving a plurality of light fixtures, and a light transmitting cap surrounding each housing, at least one license plate, an elongated cover interconnecting and integral with the caps at least at one end of said vehicle and surrounding said license plate, means affording a view of said license plate, said means comprising a gap in said cover substantially of the size of and in line with said license plate, one of said housings associated with the caps integral with the cover being provided with an outlet for light from one of said fixtures therein, the inner surfaces of said cover being provided with reflecting means, and means including said reflecting means for directing the light from said outlet upon said license plate.

2. In a motor vehicle having an outer body, said body having apertures in its front end and rear end near the outer corners thereof, a housing removably secured within each of said apertures, adapted for receiving a plurality of light fixtures, and a light transmitting cap surrounding each housing, at least one license plate, an elongated cover interconnecting and integral with the caps at least at one end of said vehicle and surrounding said license plate, said cover having a gap therein substantially of the size of and in line with said license plate, the inner surfaces of said cover being provided with reflecting means, each of the housings adjacent to said cover including a lateral outlet for the passage of light from one of the fixtures therein, and means including said reflecting surfaces for directing the light from said outlets upon said license plate.

3. In a motor vehicle having an outer body, said body having apertures in its front and rear ends near the outer corners thereof and flanged walls surrounding said apertures, a housing within each of said apertures adapted for receiving a plurality of light fixtures and having a flanged edge portion and an outlet, said edge portions adapted to be removably secured to said flanged walls, a light transmitting cap surrounding each housing, an elongated cover interconnecting the caps at least at one end of said vehicle body, said cover having at least one gap therein, a transparent license plate mounted on the walls surrounding said gap, the inner surfaces of said cover being provided with reflecting means, and means including said reflecting means for directing the light from each said outlet upon said license plate.

4. In a motor vehicle, in combination, a light system comprising a housing near each front and rear corner of said vehicle, a plurality of light sources in each said housing, a plurality of light transmitting outlets in each said housing, a light transmitting cap for each housing, an elongated cover interconnecting and integral with the caps at least at one end of said vehicle, a license plate surrounded by said cover, the inner surfaces of said cover being provided with reflecting means, said cover having a gap therein, the walls of said gap being in substantial registry with the edges of said license plate, and means including said reflecting means for directing the light from one of the outlets in each said housing upon said license plate.

5. In a motor vehicle, a light system as defined in claim 4, wherein said license plate is spaced from and free of contact with the said walls of said gap.

6. In a motor vehicle, a light system as defined in claim 4, wherein said license plate is transparent and is disposed on the walls of said gap.

7. In a motor vehicle, a light system as defined by claim 1, wherein the opposite sides of said vehicle body as viewed from above are defined by substantially parallel lines and each said light transmitting cap on one side of said vehicle body has a contour as viewed from above constituting generally an extension of the one of said lines on said side.

8. In a motor vehicle, in combination, a light system comprising a housing near each front and rear corner of said vehicle adapted for receiving a plurality of light fixtures, a light transmitting cap for each housing, an elongated cover interconnecting said caps at least at one end of said vehicle, said cover having at least one gap therein, a transparent license plate mounted in said gap, an outlet in one of said corner housings adjacent said cover, the inner surfaces of said cover being provided with reflecting means, and means including said reflecting means for directing the light from said outlet upon said license plate.

9. In a motor vehicle having an outer body, said body having apertures in its front and rear ends near the outer corners thereof, a housing disposed in each of said apertures and adapted for receiving a plurality of light fixtures, a light transmitting cap surrounding each housing, an elongated cover interconnecting and integral with said caps at least at one end of said vehicle, a license plate disposed within said cover, said cover having a gap therein spaced from said license plate and the inner surfaces of said cover being provided with reflecting means, one of said rear corner housings adjacent said cover having an outlet for the passage therethrough of light from one of said fixtures therein and means including said reflecting means for directing the light from said outlet upon said license plate.

(References on following page)

References Cited in the file of this patent

UNITED STATES PATENTS

| | | |
|---|---|---|
| 984,088 | Harris | Feb. 14, 1911 |
| 1,242,076 | Thomas | Oct. 2, 1917 |
| 1,520,257 | Morlan | Dec. 23, 1924 |
| 2,023,393 | Alfred | Dec. 10, 1935 |
| 2,104,182 | Best | Jan. 4, 1938 |
| 2,167,791 | Wyatt | Aug. 1, 1939 |
| 2,281,643 | Wahlberg | May 5, 1942 |
| 2,513,712 | Coombs | July 4, 1950 |
| 2,533,212 | Balmer | Dec. 12, 1950 |
| 2,584,576 | Gould | Feb. 5, 1952 |
| 2,651,028 | Dupree | Sept. 1, 1953 |